United States Patent
Bobinger et al.

(10) Patent No.: US 9,981,714 B2
(45) Date of Patent: May 29, 2018

(54) TWO-WHEELED VEHICLE HAVING A SPRUNG DRIVE-TRAIN SWING ARM

(71) Applicant: Bayerische Motoren Werke Aktiengesellschaft, Munich (DE)

(72) Inventors: Robert Bobinger, Huegelshart (DE); Fabian Bachmann, Munich (DE); Udo Ochner, Haimhausen (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days. days.

(21) Appl. No.: 15/047,718

(22) Filed: Feb. 19, 2016

(65) Prior Publication Data
US 2016/0167731 A1   Jun. 16, 2016

Related U.S. Application Data

(63) Continuation of application No. PCT/EP2014/067291, filed on Aug. 13, 2014.

(30) Foreign Application Priority Data

Aug. 23, 2013  (DE) .................... 10 2013 216 826

(51) Int. Cl.
*B62K 25/28*  (2006.01)
*B62K 25/30*  (2006.01)
(Continued)

(52) U.S. Cl.
CPC ............ *B62K 25/28* (2013.01); *B62K 25/286* (2013.01); *B62K 25/30* (2013.01); *B62M 6/40* (2013.01); *B62K 25/00* (2013.01); *B62M 6/55* (2013.01)

(58) Field of Classification Search
CPC ...... B62K 25/28; B62K 25/286; B62K 25/30; B62K 25/00; B62M 6/40; B62M 6/55
See application file for complete search history.

(56) References Cited

U.S. PATENT DOCUMENTS

| 4,460,192 A | * 7/1984 | Takamiya ............ B62K 15/008 |
| | | 280/278 |
| 5,452,910 A | 9/1995 | Harris |

(Continued)

FOREIGN PATENT DOCUMENTS

| CN | 1342563 A | 4/2002 |
| EP | 1 582 450 A2 | 10/2005 |

(Continued)

OTHER PUBLICATIONS

International Search Report (PCT/ISA/210) issued in PCT Application No. PCT/EP2014/067291 dated Sep. 29, 2014 with English translation (Six (6) pages).

(Continued)

*Primary Examiner* — Tony H Winner
*Assistant Examiner* — Marlon A Arce
(74) *Attorney, Agent, or Firm* — Crowell & Moring LLP (57) ABSTRACT

A frame assembly is provided for a two-wheeled vehicle, in particular for a bicycle, including: a main frame, which has a head tube for connecting to a front wheel mount and a saddle connection for connecting to a saddle; and a drive-train swing arm pivotably connected to the main frame. The drive-train swing arm includes a wheel suspension for a rear wheel to be driven and a pedal-crank drive having a pedal crank for driving the rear wheel by muscle force of a rider. The pedal-crank drive is associated with the drive-train swing arm. The drive-train swing arm is pivotably connected to the main frame by a multijoint assembly.

15 Claims, 4 Drawing Sheets

(51) Int. Cl.
  *B62M 6/40* (2010.01)
  *B62M 6/55* (2010.01)
  *B62K 25/00* (2006.01)

(56) References Cited

U.S. PATENT DOCUMENTS

| | | | | |
|---|---|---|---|---|
| 5,772,227 | A * | 6/1998 | Michail | B62K 3/02 |
| | | | | 280/275 |
| 5,813,683 | A | 9/1998 | Kulhawik et al. | |
| 5,860,665 | A | 1/1999 | Giles | |
| 6,286,848 | B1 * | 9/2001 | Augustin | B62K 15/008 |
| | | | | 280/287 |
| 2002/0027035 | A1 | 3/2002 | Gogo | |
| 2005/0057018 | A1 | 3/2005 | Saiki | |
| 2011/0183805 | A1 * | 7/2011 | Chan | B62M 6/50 |
| | | | | 475/254 |
| 2013/0285346 | A1 * | 10/2013 | Wimmer | B62K 25/286 |
| | | | | 280/284 |
| 2016/0368559 | A1 * | 12/2016 | Voss | B62K 25/286 |

FOREIGN PATENT DOCUMENTS

| | | |
|---|---|---|
| EP | 1 582 450 B1 | 10/2008 |
| EP | 2 228 290 A2 | 9/2010 |
| FR | 2 803 576 A3 | 7/2001 |
| JP | 8-258781 A | 10/1996 |
| WO | WO 99/11513 A1 | 3/1999 |
| WO | WO 2012/027900 A1 | 3/2012 |

OTHER PUBLICATIONS

German-language Office Action issued in counterpart German Application No. 10 2013 216 826.8 dated Mar. 16, 2016 (Six (6) pages).

Chinese-language Office Action issued in counterpart Chinese Application No. 201480046327.0 dated Jul. 21, 2017 with English translation (Fifteen (15) pages).

* cited by examiner

TWO-WHEELED VEHICLE HAVING A SPRUNG DRIVE-TRAIN SWING ARM

CROSS REFERENCE TO RELATED APPLICATIONS

This application is a continuation of PCT International Application No. PCT/EP2014/067291, filed Aug. 13, 2014, which claims priority under 35 U.S.C. § 119 from German Patent Application No. 10 2013 216 826.8, filed Aug. 23, 2013, the entire disclosures of which are herein expressly incorporated by reference.

BACKGROUND AND SUMMARY OF THE INVENTION

The invention relates to a frame assembly for a two-wheeled vehicle, in particular for a bicycle, having a main frame which includes a head tube for connecting to a front wheel mount, and a saddle connection for connecting to a saddle, and a drive-train swing arm which is pivotably connected to the main frame. The invention also relates to a two-wheeled vehicle equipped with a corresponding frame assembly.

EP 1 582 450 B1 discloses a bicycle drive unit for an electric-motor-assisted bicycle, referred to as a "PEDELEC" which is coupled in a sprung fashion to a bicycle frame of the bicycle. The bicycle drive unit includes a pedal crank and a bicycle chain for transmitting a torque, generated by the rider's muscle force, from the pedal crank to the rear wheel of the bicycle. A movement of the pedal crank is assisted by a motor-activated drive mechanism.

The entire frame assembly has a pivoting joint connection between the bicycle drive unit and the bicycle frame with a defined pivoting axle which is formed by a pivot bearing, with the result that the bicycle drive unit can be pivoted, together with the bottom-bracket bearing with respect to the frame. In the event of a pivoting movement of the drive unit about the pivoting axle, which is of rigid design, the pedal crank which is arranged at a distance therefrom also pivots during a spring-compression or spring-extension process of the bicycle drive assembly in such a way that a distance between the saddle and the bottom-bracket bearing of the pedal crank is changed. Since this distance should be adapted to the length of the rider's legs, the changing distance causes the angles of the rider's legs to vary or, under unfavorable conditions, even causes contact between the foot and the pedal to be lost.

This has adverse effects on comfort, which are perceived as disruptive, and in an extreme case even constitutes an additional accident risk.

The object of this invention is therefore to make available a sprung frame assembly for a two-wheeled vehicle, which assembly permits comfortable and safe operation of the two-wheeled vehicle at all times.

This and other objects are achieved with a frame assembly for a two-wheeled vehicle, and with a corresponding two-wheeled vehicle, in accordance with embodiments of the invention.

Accordingly, a frame assembly for a two-wheeled vehicle is provided, in particular for a bicycle, having a main frame which comprises a head tube for connecting to a front wheel mount, and a saddle connection for connecting to a saddle, and a drive-train swing arm which is pivotably connected to the main frame. The drive-train swing arm includes a wheel suspension for a rear wheel which is to be driven, and a pedal-crank drive which is assigned to the drive-train swing arm and has a pedal crank for driving the rear wheel by way of a rider's muscle force. The drive-train swing arm is pivotably connected to the main frame by way of a multi joint assembly.

The frame assembly can therefore be provided for a two-wheeled vehicle such as, for example, a bicycle. The main frame is configured as part of the entire frame assembly in such a way that the front-wheel mount, that is to say, for example, a single-arm or two-arm front wheel fork can be connected in a steerable fashion to the main frame by way of the head tube. The saddle can also be connected to the main frame by way of the saddle connection. The saddle connection can provide, for example, a direct or indirect connection between the frame and the saddle, or include a saddle tube via which the saddle can be connected to the main frame, preferably in a vertically adjustable fashion, by means of a separate saddle support which engages in the saddle.

The drive-train swing arm includes, for driving the rear wheel, the complete pedal-crank drive (including the pedal crank) and combines the latter in a common, functionally integrated drive unit which is pivotably connected, as a modular composite component, to the main frame which is embodied separately.

This configuration of the drive-train swing arm as a modular composite component provides the possibility of arranging the pedal crank and a rear wheel hub, which bears the rear wheel, at a distance from one another which is always constant and which does not change even when the drive-train swing arm executes a spring-compression movement or spring-extension movement. In this way, it is possible to provide a transmission, such as, for example, a chain drive or belt drive, with a constant length and constant tension. It is therefore possible to dispense with separate tensioners which would otherwise be necessary, for example, if the pedal crank were to be assigned to the main frame, and in this case the distance of the pedal crank relative to the rear wheel hub were to change owing to the pivoting movement.

By using the proposed frame assembly it is also possible to prevent a pedal impact which would otherwise occur during spring compression or spring extension and which also occurs as a result of the pivoting movement of the rear wheel or of the swing arm and which can be perceived as unpleasant by the driver.

The embodiment of the drive-train swing arm as a modular composite component also permits independent pre-assembly and a design which is independent of the configuration of the rest of the frame assembly or the rest of the two-wheeled vehicle. The drive-train swing arm can therefore also be used for frame assemblies and frame sizes which are configured differently.

According to the invention, the drive-train swing arm is movably connected to the main frame by the multi joint assembly. This means that the multi joint assembly serves as a connecting member between the two elements and is coupled in an articulated fashion to the main frame, on the one hand, and to the drive-train swing arm, on the other. In other words, the multi joint assembly is rotatably connected to the main frame via at least one of its joints and via at least one further of its joints to the drive-train swing arm, in such a way that the described pivoting movement capability of the drive-train swing arm relative to the main frame can be made available.

In addition, the proposed use of the multi-joint assembly for connecting the drive-train swing arm to the main frame enables a particularly advantageous pivoting movement capability which makes available particular degrees of freedom.

For example, the multi joint assembly can be embodied in such a way that the drive-train swing arm can pivot relative to the main frame, about a virtual pivoting axis. This means that although individual parts of the multi joint assembly rotate about their defined pivot joints with rotatably mounted "real" pivoting axles, the drive-train swing arm is in its entirety pivoted about a resulting "virtual" or effective pivoting axis which is not defined by a real (that is to say present as a real component) axle, but instead results merely from the respective individual pivoting movements of the individual parts of the multiple joint.

The multi joint assembly can, for this purpose, preferably include a number of pivoting axles, wherein the pivoting axles are arranged spaced apart from and in parallel with the virtual pivoting axis. Thus, there is no coaxial identity between the virtual pivoting axis and a real pivoting axle of a pivot joint of the multi-joint assembly.

In particular, the multi joint assembly can be embodied in such a way that the virtual pivoting axis is arranged essentially coaxially with respect to a bottom-bracket bearing axis of the pedal crank of the pedal-crank drive. This has the effect that, on the one hand, during the pivoting of the drive-train swing arm between a defined initial position and a defined end position of maximum pivoting relative to the main frame, a relative position of the virtual pivoting axis with respect to the main frame remains essentially retained in a positionally fixed fashion. At the same time, the positionally fixed pivoting axis is also preferably located coaxially with respect to the bottom-bracket bearing axis, with the result that despite a pivoting movement of the drive-train swing arm said pivoting axis also remains positionally fixed (with respect to the main frame). For the user, the pedal-crank center of rotation of the bottom-bracket bearing appears to be fixed in a way analogous to a customary bicycle without a rear wheel swing arm.

The term "positionally fixed" is to be understood as an invariable position of the virtual pivoting axis in relation to the main frame, irrespective of the pivoting position in which the drive-train swing arm is currently located.

The term "essentially coaxially" is to be understood as meaning not only completely coaxial assembly but also a relative movement (or a corresponding offset) of the bottom-bracket bearing axis with respect to the virtual pivoting axis which is negligible compared to the magnitude of the scope of the pivoting movement.

For example, the multi joint assembly can be embodied in such a way that pivoting of the drive-train swing arm about the virtual pivoting axis brings about a maximum offset $\Delta x$ of a relative position of the bottom-bracket bearing axis with respect to the main frame in the longitudinal direction x of the frame assembly by at maximum $\Delta x=+/-20$ mm, preferably at maximum $\Delta x=+/-10$ mm, particularly preferably at maximum $\Delta x=+/-5$ mm and/or a maximum offset $\Delta z$ in the vertical direction z of the frame assembly by at maximum $\Delta z=+/-20$ mm, preferably $\Delta z=+/-10$ mm, particularly preferably by at maximum $\Delta z=+/-4$ mm.

This makes it possible that the small offset of the bottom-bracket bearing, occurring in comparison with the scope of the relative pivoting movement, with respect to the main frame and therefore with respect to the user is not perceived by the user as he pedals the pedal crank. Furthermore, if the offset is reduced to the preferred, or the particularly preferred, values, the offset also cannot be perceived by the user even when there is no pedaling movement, with the result that, on the one hand, comfort but also the safety of the user can be significantly improved.

According to one embodiment, the multi joint assembly is configured as a four-joint assembly. The four-joint assembly permits, given a corresponding kinematic configuration, the described pivoting movement capability to be produced in a simple and compact way. Of course, a kinematic device with more than four joints can be provided for making available a comparable pivoting movement.

For example, the four-joint assembly can include two pivoting elements, wherein each of the two pivoting elements is connected by, in each case, a first section to the main frame so as to be pivotable about, in each case, a first pivoting axle, and by, in each case, a second section, arranged spaced apart from the respective first section, to the drive-train swing arm so as to be pivotable about, in each case, a second pivoting axle. Each pivoting element is therefore coupled, on the one hand, in a rotatably movable fashion to the main frame and, on the other hand, in a rotatably movable fashion to the drive-train swing arm. The result is that each pivoting element can pivot relative to the main frame and relative to the drive-train swing arm.

In other words, the drive-train swing arm is therefore connected in a rotatably movable fashion by way of the two pivoting elements to the main frame in such a way that no common "real" pivoting axle, which is common to the drive-train swing arm and the main frame, has to be provided between the two components.

Furthermore, the frame assembly also can include a spring-damper assembly for damping the pivoting movement of the drive-train swing arm relative to the main frame.

According to one embodiment, the spring-damper assembly can be coupled by a first end to the drive-train swing arm and by an opposing second end can be supported indirectly or directly on the main frame.

Preferably, the first end of the spring-damper assembly is coupled for this purpose to the drive-train swing arm by way of a securing device, which can be adjusted to a number of defined positions, in order to vary a length of the spring-damper assembly in a defined fashion. In this way, a length of the spring-damper assembly, and therefore the spring characteristic and/or damper characteristic thereof can be set and varied.

For example, it is also possible for the second end of the spring-damper assembly to be connected to one of the pivoting elements and be supported thereby on the main frame.

Figure 4:
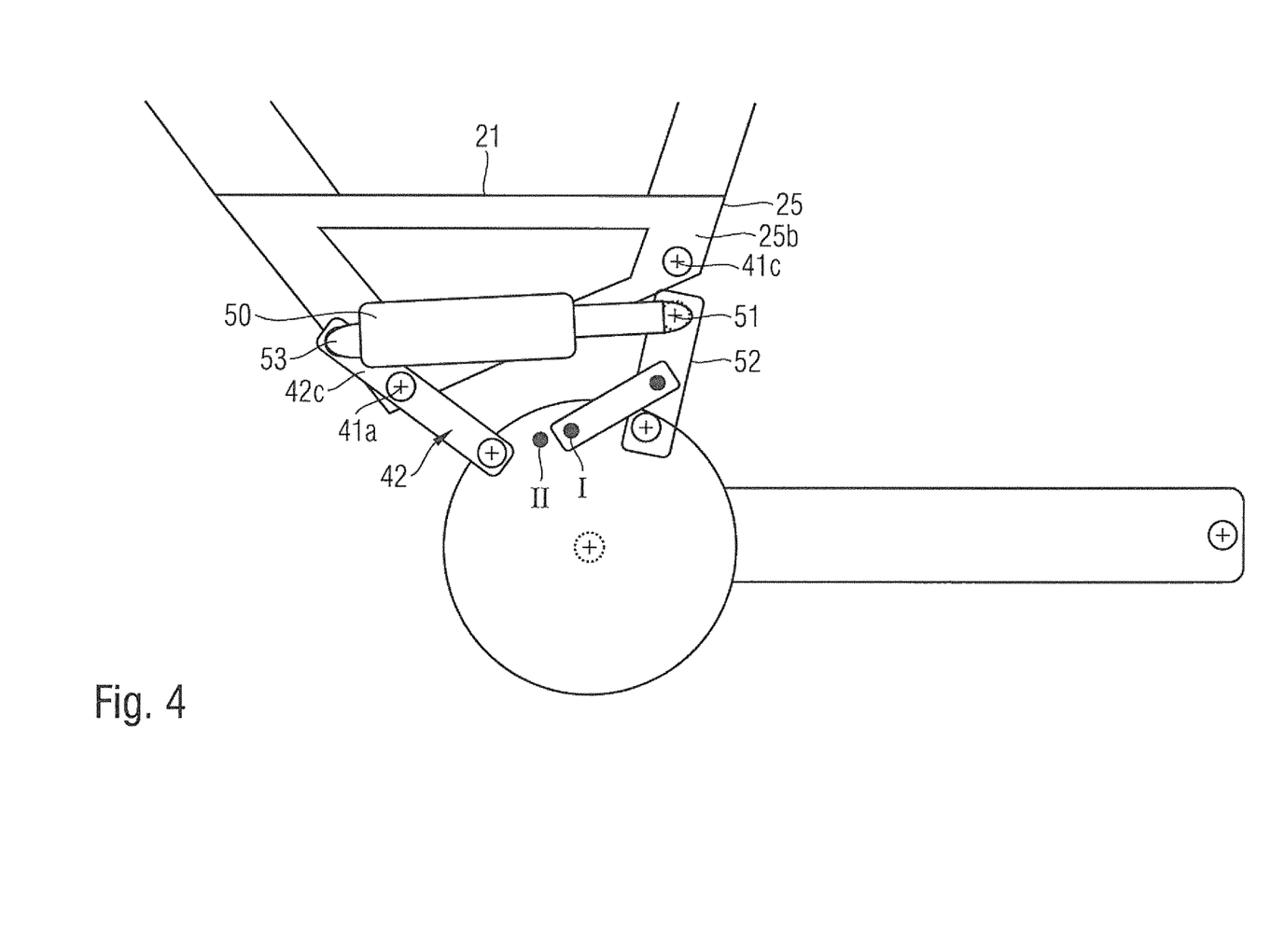
FIG. 4 is a view of a detail of a spring-damper assembly for the two-wheeled vehicle from FIG. 1.

According to a further embodiment, the main frame includes a fork-shaped mount for connecting the multi joint assembly to the main frame, wherein the spring-damper assembly is arranged between the multi joint assembly and the main frame, within the fork-shaped mount. The fork-shaped mount has, for example, two forks, each with two fork arms, wherein on each fork the respective first section of the respective pivoting element is mounted in a rotatably movable fashion between the two fork arms. Alternatively, it is possible, as illustrated in FIG. 4, for the respective fork arms of the two forks which are arranged on the same side to be connected to one another to form a common fork arm per side of the two-wheeled vehicle.

In addition, the spring-damper assembly can be arranged between the fork-shaped mount and the pivoting elements, with the result that in this case a particularly compact and space-saving overall assembly is produced.

The main frame can have various shapes and can include, for example, one or more profile elements. In particular, at least one profile section can have a circular, oval, rectangular or polygonal cross section. Suitable metals and also plastics, in particular fiber-reinforced plastics with a suitable fiber material for reinforcement, as well as all other materials which are suitable for a two-wheeled vehicle frame can be used as the material. Preferably glass fibers, carbon fibers, aramide fibers and/or other suitable reinforcement fibers can preferably be used as the fiber materials.

According to a further embodiment, the drive-train swing arm has a housing which encloses at least the pedal-crank drive and has the purpose of encapsulating the drive-train swing arm with respect to its surroundings. The drive-train swing arm and the components, integrated therein, of the pedal-crank drive can therefore be protected against external influences such as moisture and soiling, with the result that cleaning and maintenance are significantly simplified.

According to one preferred embodiment, the drive-train swing arm includes an auxiliary motor for driving the rear wheel, wherein a rotor axis of the auxiliary motor is arranged coaxially with respect to a bottom-bracket bearing axis of the pedal crank of the pedal-crank drive. The auxiliary motor can be embodied, for example, as an electric motor and can be designed to be the sole means of driving the two-wheeled vehicle and/or to be a drive which assists the user during pedaling.

Furthermore, at least part of a housing of the auxiliary motor can be embodied in one piece with the wheel suspension. Accordingly, it is possible to manufacture the housing of the auxiliary motor or a part thereof from the same material as the wheel suspension, as a common uniform component. This can be done, for example, by way of a known and suitable metal casting method or plastic molding method.

As already described, the pedal-crank drive can include a transmission for transmitting a torque from the pedal crank and/or the auxiliary motor to the rear wheel of the two-wheeled vehicle, in particular a bicycle chain and/or a toothed belt. This transmission can optionally also be integrated into the housing of the drive-train swing arm.

Furthermore, a two-wheeled vehicle, in particular a bicycle or an electric bicycle, is made available, wherein the two-wheeled vehicle includes a frame assembly according to the description. An electric bicycle is to be understood as being any bicycle with an electric drive motor, that is to say both what is referred to as an "e-bike", which has an electric motor as the sole means of driving the wheel, as well as what is referred to as a "Pedelec", in which the electric motor is activated by the pedaling by the user and in this way assists the user's movements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
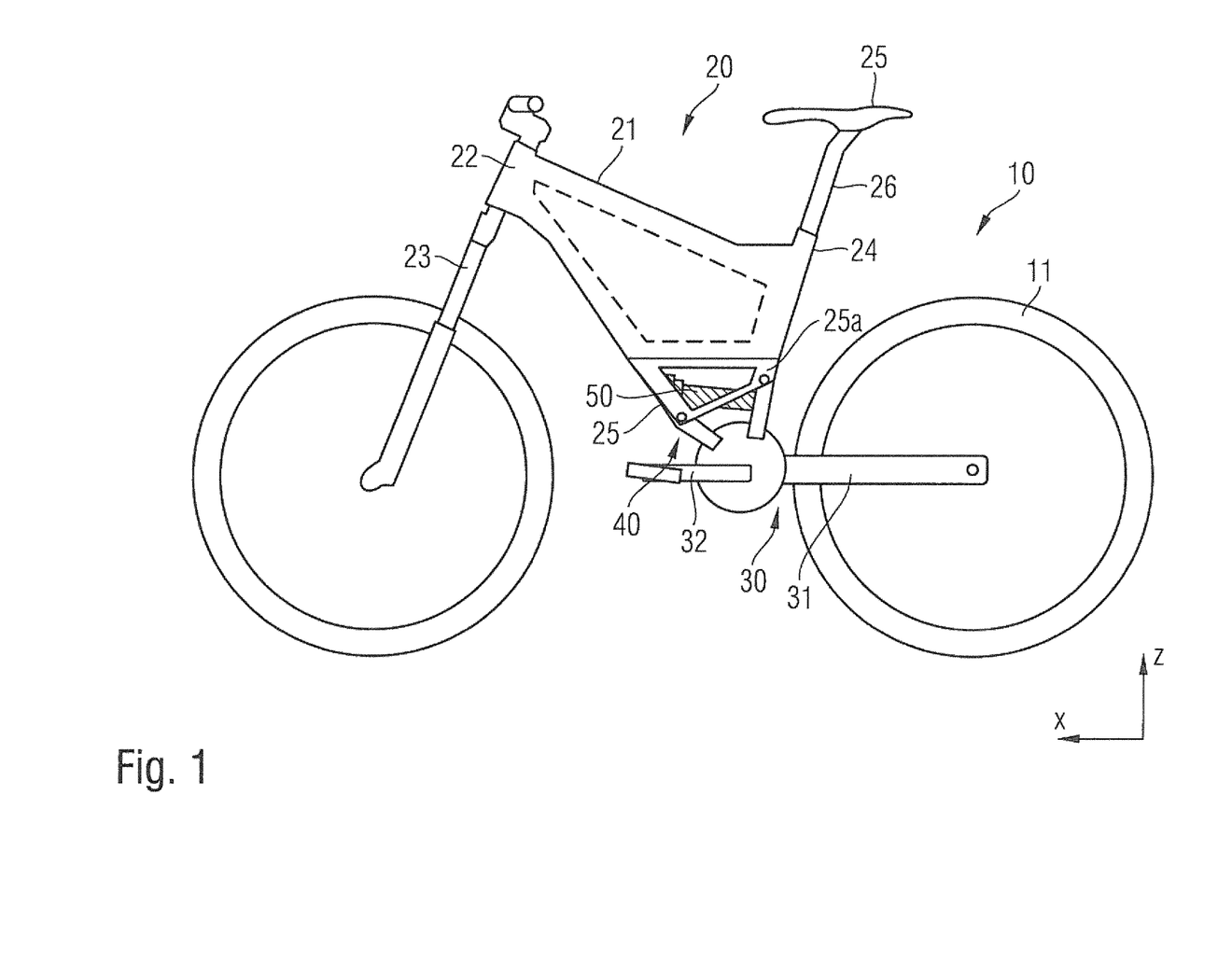
FIG. 1 is a schematic side view of a two-wheeled vehicle according to an embodiment of the invention.

FIG. 1 shows a two-wheeled vehicle 10 in a schematic side view, wherein the two-wheeled vehicle 10 can be embodied, in particular, as a bicycle or electric bicycle (e-bike or Pedelec). The two-wheeled vehicle 10 has a frame assembly 20 which includes, inter alia, a main frame 21. The main frame 21 can have various shapes and is merely indicated schematically in FIG. 1. In particular, the main frame 21 can have one or more profile elements with any desired cross section, preferably one or more tube profiles (not illustrated).

A head tube 22, which is provided for connecting to a front wheel mount 23 such as, for example, a front wheel fork with two fork arms or a wheel mount with merely one fork arm, is arranged at a front end, pointing in the direction of travel x, of the main frame 21. Furthermore, a saddle connection 24 for connecting to a saddle 25 or to a saddle support 26 which bears the saddle 25 is arranged on the main frame 21.

The two-wheeled vehicle 10 also has a drive-train swing arm 30 which is pivotably connected to the main frame 21. The drive-train swing arm 30 defines a compact and functionally integrated drive unit and includes for this purpose a wheel suspension 31 for a rear wheel 11 which is to be driven, and a pedal crank drive which is assigned to the drive-train swing arm 30 and has a pedal crank 32 for driving the rear wheel 11 by means of a rider's muscle force. In addition, in the illustrated embodiment the drive-train swing arm 30 is pivotably connected to the main frame 21 by way of a four-joint assembly 40.

Figure 2:
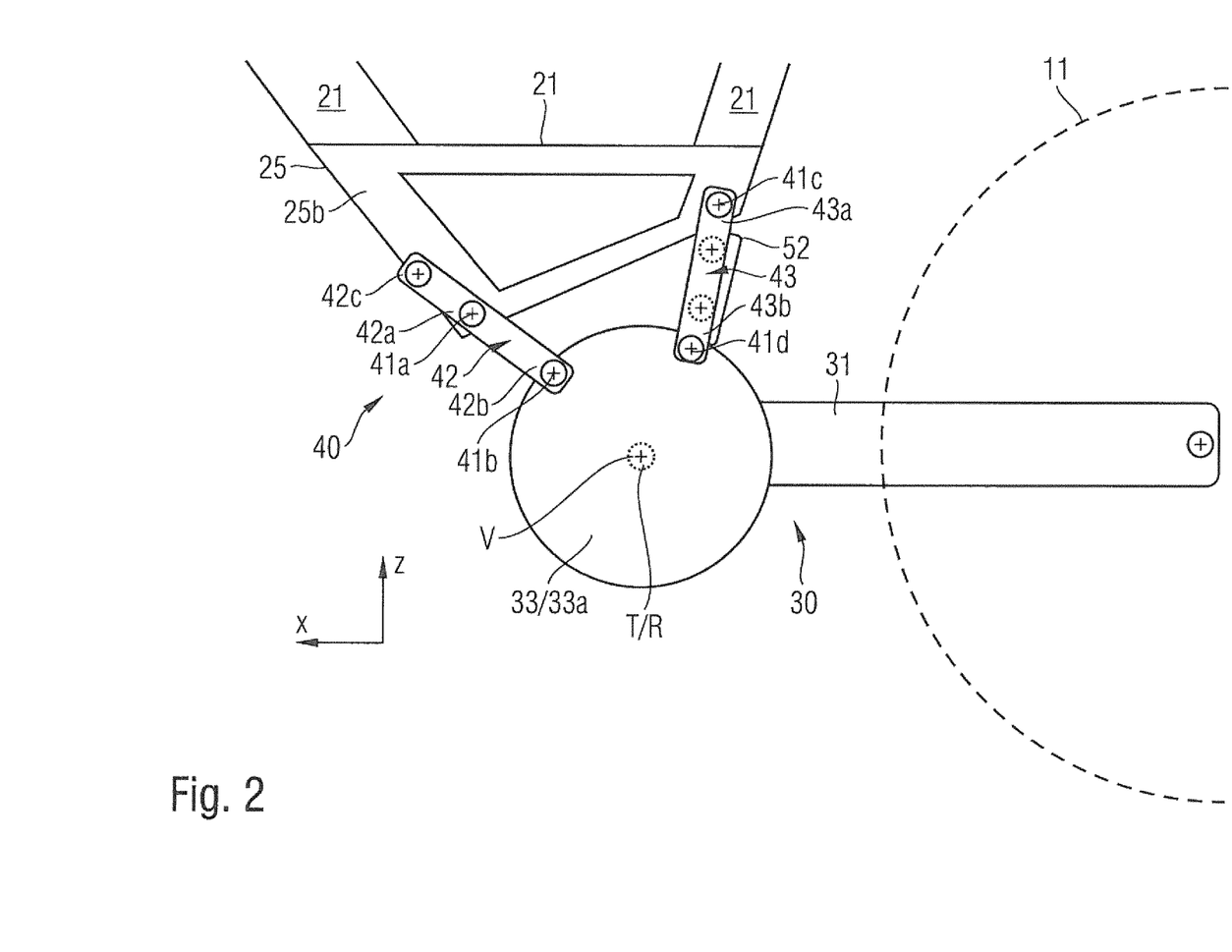
FIG. 2 is a detailed view of a frame assembly of the two-wheeled vehicle from FIG. 1 with a rear wheel swing arm in a first pivoting position.

FIG. 2 illustrates a detailed view of the frame assembly 20 of the two-wheeled vehicle 10 from FIG. 1 and the four-joint assembly 40 with the drive-train swing arm 30 in a first pivoting position.

The four-joint assembly 40 is embodied in such a way that the drive-train swing arm 30 can pivot relative to the main frame 21 about a virtual pivoting axis V.

For this purpose, the four-joint assembly 40 includes four pivoting axles 41a-d, wherein the pivoting axles 41a-d are arranged spaced apart from and in parallel with the virtual pivoting axis V. The result is that the virtual pivoting axis V does not coincide coaxially with one of the four pivoting axles 41a-d of the four-joint assembly 40 but rather is at a distance therefrom.

This configuration permits the four-joint assembly 40 to be embodied in such a way that the virtual pivoting axis V is arranged essentially coaxially with respect to a bottom-bracket bearing axis T of the pedal crank 32 of the pedal-crank drive.

Figure 3:
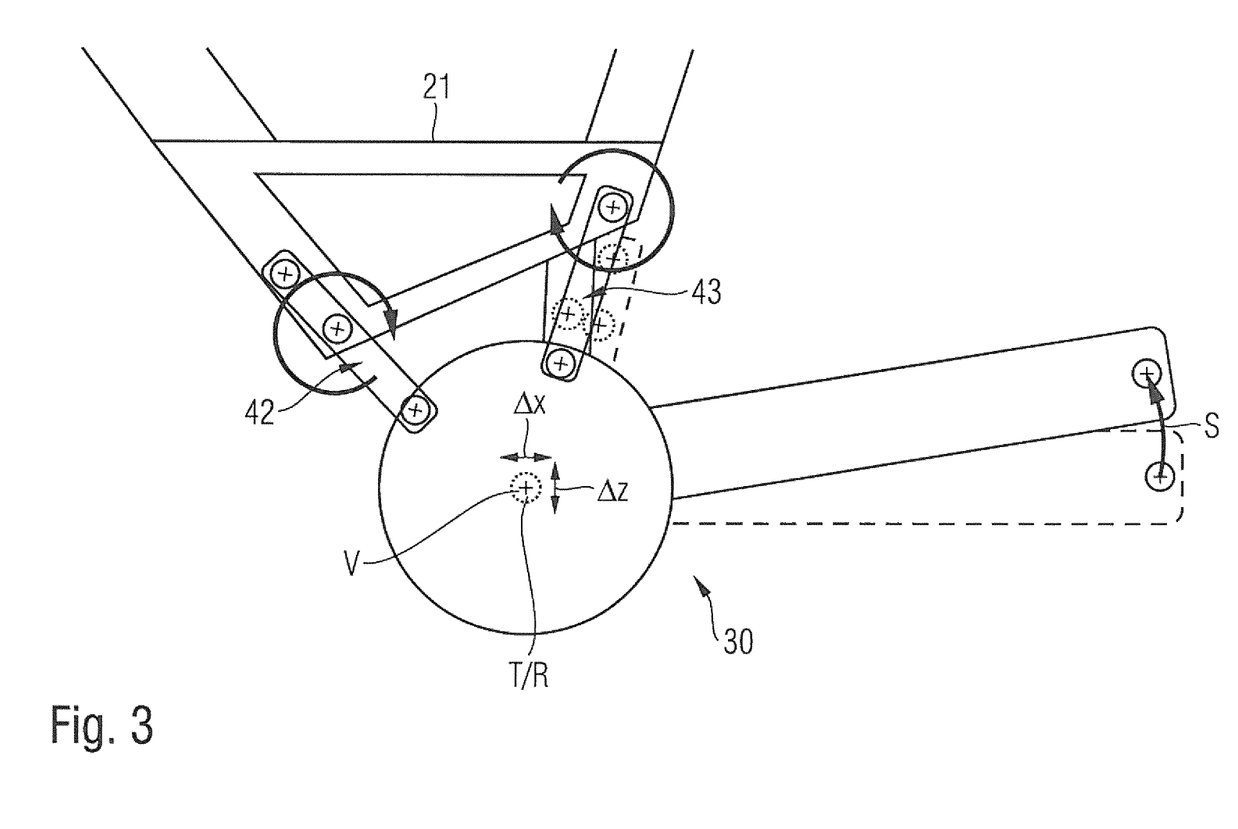
FIG. 3 shows a rear wheel swing arm from FIG. 2 in a second pivoting position.

This means that the four-joint assembly 40 is embodied in such a way that pivoting (pivoting movement S)—illustrated in FIG. 3—of the drive-train swing arm 30 about the virtual pivoting axis (V) brings about a maximum offset $\Delta x$ of a relative position of the bottom-bracket bearing axis with respect to the main frame in the longitudinal direction x of the frame assembly 20 by at maximum $\Delta x = +/-20$ mm, preferably at maximum $\Delta x = +/-10$ mm, particularly preferably at maximum $\Delta x = +/-5$ mm and/or a maximum offset $\Delta z$ in the vertical direction z of the frame assembly by at maximum $\Delta z = +/-20$ mm, preferably $\Delta z = +/-10$ mm, particularly preferably by at maximum $\Delta z = +/-4$ mm.

The four-joint assembly 40 has, according to FIG. 2, two pivoting elements 42, 43 which are each connected, by, in each case, a first section 42a, 43a to the main frame 21 so as to be pivotable about, in each case, a first of the pivoting axles 41a, 41c and by, in each case, a second section 42b, 43b, arranged spaced apart from the respective first section 42a, 43a, to the drive-train swing arm 30 so as to be pivotable about, in each case, a second of the pivoting axles 41b,d. As is also illustrated in FIG. 3, in the case of a pivoting movement S (illustrated for a spring-compression movement, a spring-extension movement is directed in the opposite direction), a pivoting movement of the pivoting element relative to the main frame 21 counter to a rotational direction of the pivoting direction S is brought about, with the result that the virtual pivoting axis V or the bottom-bracket bearing axis T is shifted merely by the respective described maximum offset, and therefore remains essentially "positionally fixed" with respect to the main frame 21.

In addition, the drive-train swing arm 30 can include an auxiliary motor 33 for driving the rear wheel, wherein a rotor axis R of the auxiliary motor 33 is arranged coaxially with respect to the bottom-bracket bearing axis T of the pedal crank 32 of the pedal-crank drive. FIG. 2 only illustrates the housing 33a of the auxiliary motor 33. It is optionally possible, in order to make available a design which is as compact and modular as possible, to embody at least part of the housing 33a of the auxiliary motor 33 in one piece with the wheel suspension 31.

A transmission for transmitting a torque from the pedal crank 32 or the auxiliary motor 33 to the rear wheel 11 of the two-wheeled vehicle 10 has not been illustrated for the sake of clarity. However, it is self-evident that a corresponding transmission such as, for example, a bicycle chain and/or a toothed belt is correspondingly provided.

The optional embodiment of the drive-train swing arm 30 with a housing which encloses at least the pedal-crank drive and has the purpose of encapsulating the drive-train swing arm with respect to its surroundings is not illustrated either.

FIG. 4 illustrates a view of a detail of a spring-damper assembly 50 for the two-wheeled vehicle 10 from FIG. 1, which spring-damper assembly 50 also has the frame assembly 20 for damping the pivoting movement of the drive-train swing arm 30 relative to the main frame 21.

The spring-damper assembly 50 is pivotably coupled by a first end 51 to the drive-train swing arm 30, by way of a securing assembly 52 which is connected in a rigid or at least rotationally fixed fashion to the drive-train swing arm 30 and is connected by an opposing second end 53 of the spring-damper assembly 50 to one of the pivoting elements 42, and supported by the pivoting element 42 indirectly on the main frame 21. For this purpose, the corresponding pivoting element 42 includes an additional connecting section 42c (cf. also FIG. 2).

The securing assembly 52 can optionally be connected in such a way that it can be adjusted into a number of different positions I, II for setting a length of the spring-damper assembly. Of course, more than the two illustrated positions I, II for setting can be provided.

In addition, the main frame 21 has a two-arm, fork-shaped mount 25 for connecting or coupling the four-joint assembly 40 to the main frame 21, wherein the spring-damper assembly 50 is arranged between the four-joint assembly 40 and the main frame 21 with an essentially horizontal orientation within the fork-shaped mount 25. Both fork arms 25a,b of the fork-shaped mount 25 are arranged lying one behind the other in the illustrated viewing direction and in parallel with respect to the plane of the image, wherein the spring-damper assembly 50 is arranged between the two fork arms 25a,b, with the result that a particularly compact and space-saving overall assembly is produced. However, for the sake of a better figurative illustration of the spring-damper assembly 50, FIG. 4 only illustrates the rear fork arm of the two fork arms 25b. In contrast, FIG. 1 has an illustration in which the front fork arm 25a is illustrated, and correspondingly the spring-damper assembly 50 lying behind it is concealed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A frame assembly for a two-wheeled vehicle, comprising:
    a main frame comprising a head tube and a saddle connection;
    a drive-train swing arm comprising a wheel suspension for a rear wheel to be driven and having a pedal-crank drive assigned to the drive-train swing arm, the pedal-crank drive being non-rotationally coupled to an arm of the wheel suspension extending between a rotational axis of the rear wheel and the pedal-crank drive and having a rotatable pedal crank configured to drive the rear wheel via a rider's muscle force; and
    a multi joint assembly by which the drive-train swing arm is connected to the main frame such that the pedal-crank-drive is pivotable relative to the main frame when the two-wheeled vehicle is being ridden by the rider,
    wherein
        the multi joint assembly is configured such that the drive-train swing arm is pivotable relative to the main frame about a virtual pivoting axis that is arranged essentially coaxially with respect to a bottom-bracket bearing axis of the pedal crank of the pedal-crank drive,
        the multi joint assembly comprises a four-joint assembly, the four-joint assembly including
            a first pivoting element having a first end pivotably connected to the pedal-crank drive and arranged to rotate about a first pivoting axle, and a second end pivotably connected to the main frame and arranged to rotate about a second pivoting axle, and
            a second pivoting element located away from the first pivoting element, the second pivoting element having a first end pivotably connected to the pedal-crank drive and arranged to rotate about a third pivoting axle, and a second end pivotably connected to the main frame and arranged to rotate about a fourth pivoting axle, and
        the multi-joint assembly is configured such that when the two-wheeled vehicle is being ridden by the rider, a pivoting movement of the pedal-crank drive in a rotation direction opposite pivoting movements of the first and second pivoting elements maintains the virtual pivoting axis essentially coaxial with the bottom-bracket bearing axis.

2. The frame assembly according to claim 1, wherein:
    the pivoting axles are arranged spaced apart from and in parallel with the virtual pivoting axis.

3. The frame assembly according to claim 1, wherein the multi joint assembly is configured such that pivoting of the drive-train swing arm about the virtual pivoting axis brings about a maximum offset $\Delta x$ of a relative position of a bottom-bearing bracket axis of the pedal crank with respect to the main frame in a longitudinal direction x of the frame assembly by maximum $\Delta x=+/-20$ mm and a maximum offset $\Delta z$ in a vertical direction z of the frame assembly by at maximum $\Delta z=+/-20$ mm.

4. The frame assembly according to claim 3, wherein the maximum $\Delta x=+/-10$ mm and the maximum $\Delta z=+/-10$ mm.

5. The frame assembly according to claim 3, wherein the maximum $\Delta x=+/-5$ mm and the maximum $\Delta z=+/-4$ mm.

6. The frame assembly according to claim 1, further comprising:
a spring-damper assembly arranged to damp a pivoting movement of the drive-train swing arm relative to the main frame.

7. The frame assembly according to claim 6, wherein the spring-damper assembly is coupled by a first end to the drive-train swing arm and by an opposing second end is supported indirectly or directly on the main frame.

8. The frame assembly according to claim 7, wherein the first end of the spring-damper assembly is coupled to the drive-train swing arm by a securing device, which securing device is adjustable to a number of defined positions, in order to vary a length of the spring-damper assembly in a defined manner.

9. The frame assembly according to claim 7, wherein the second end of the spring-damper assembly is connected to one of two pivoting elements of the multi joint assembly and is supported thereby on the main frame.

10. The frame assembly according to claim 6, wherein the main frame comprises a fork-shaped mount for connecting the multi joint assembly to the main frame, wherein the spring-damper assembly is arranged between the multi joint assembly and the main frame, within the fork-shaped mount.

11. The frame assembly according to claim 1, wherein the drive-train swing arm comprises an auxiliary motor for driving the rear wheel, wherein a rotor axis of the auxiliary motor is arranged coaxially with respect to a bottom-bracket bearing axis of the pedal crank of the pedal-crank drive.

12. The frame assembly according to claim 11, wherein at least part of a housing of the auxiliary motor is embodied in one piece with the wheel suspension.

13. The frame assembly according to claim 1, wherein the pedal-crank drive comprises a transmission for transmitting a torque from the pedal crank and/or an auxiliary motor to the rear wheel of the two-wheeled vehicle.

14. The frame assembly according to claim 13, wherein the transmission is a chain or a toothed belt.

15. A two-wheeled vehicle, comprising:
a bicycle frame assembly, the bicycle frame assembly comprising a main frame comprising a head tube and a saddle connection;
a drive-train swing arm comprising a wheel suspension for a rear wheel to be driven and having a pedal-crank drive assigned to the drive-train swing arm, the pedal-crank drive being non-rotationally coupled to an arm of the wheel suspension extending between a rotational axis of the rear wheel and the pedal-crank drive and having a rotatable pedal crank configured to drive the rear wheel via a rider's muscle force; and
a multi joint assembly by which the drive-train swing arm is connected to the main frame such that the pedal-crank-drive is pivotable relative to the main frame when the two-wheeled vehicle is being ridden by the rider,
wherein
the multi joint assembly is configured such that the drive-train swing arm is pivotable relative to the main frame about a virtual pivoting axis that is arranged essentially coaxially with respect to a bottom-bracket bearing axis of the pedal crank of the pedal-crank drive,
the multi joint assembly comprises a four-joint assembly, the four-joint assembly including
a first pivoting element having a first end pivotably connected to the pedal-crank drive and arranged to rotate about a first pivoting axle, and a second end pivotably connected to the main frame and arranged to rotate about a second pivoting axle, and
a second pivoting element located away from the first pivoting element, the second pivoting element having a first end pivotably connected to the pedal-crank drive and arranged to rotate about a third pivoting axle, and a second end pivotably connected to the main frame and arranged to rotate about a fourth pivoting axle, and
the multi-joint assembly is configured such that when the two-wheeled vehicle is being ridden by the rider, a pivoting movement of the pedal-crank drive in a rotation direction opposite pivoting movements of the first and second pivoting elements maintains the virtual pivoting axis essentially coaxial with the bottom-bracket bearing axis.

* * * * *